(No Model.)
T. J. WEIR.
HEARSE ATTACHMENT.
No. 469,617. Patented Feb. 23, 1892.
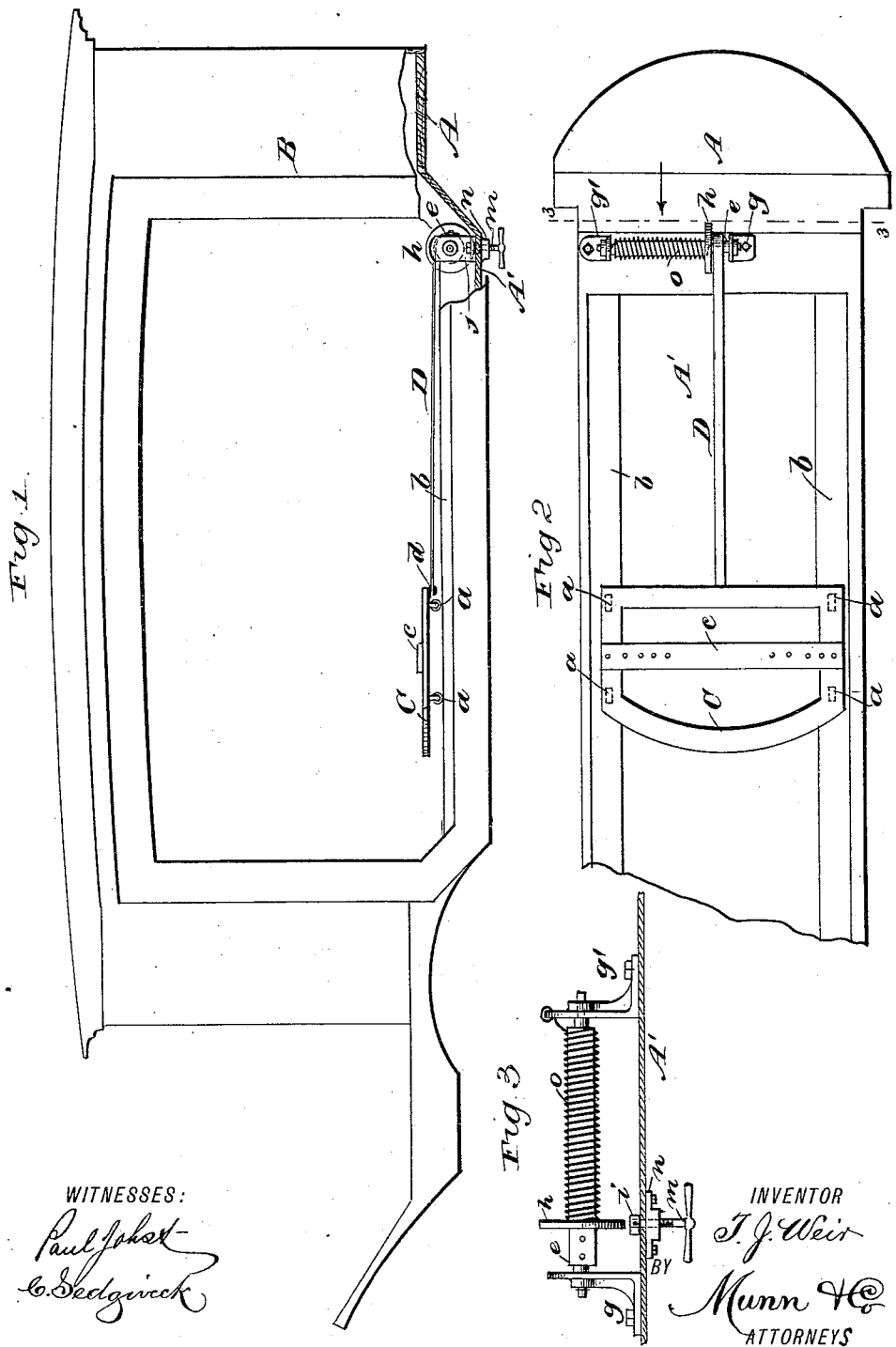
WITNESSES:
Paul Johst
C. Sedgwick
INVENTOR
T. J. Weir
BY
Munn & Co.
ATTORNEYS

UNITED STATES PATENT OFFICE.

THOMAS J. WEIR, OF CINCINNATI, OHIO.

HEARSE ATTACHMENT.

SPECIFICATION forming part of Letters Patent No. 469,617, dated February 23, 1892.

Application filed July 15, 1891. Serial No. 399,636. (No model.)

*To all whom it may concern:*

Be it known that I, THOMAS J. WEIR, of Cincinnati, in the county of Hamilton and State of Ohio, have invented a new and useful Hearse Attachment, of which the following is a full, clear, and exact description.

For convenience in the introduction and removal of a coffin, hearses as usually constructed have a longitudinally-movable truck provided, whereon the foot portion of a burial-casket is deposited when it is to be placed within the vehicle, a strap that is connected to the truck and extended to the rear end of the hearse furnishing means for manipulation and control of the traveling truck.

When the truck of a hearse constructed as has been explained is drawn rearward for the removal of a coffin therefrom, the controlling-strap accumulates in a mass at the rear, and care must be used to prevent it from obstructing the free travel of the truck.

The object of this invention is to provide means for the automatic coiling of the truck-strap for a hearse, so that said strap will be held in tension wherever the truck may be located in the hearse, and thus avoid the inconvenience incidental to ordinary methods of construction.

To this end my invention consists in the provisions of an automatic strap-coiling device for a hearse; and it further consists in the construction and combination of parts, as is hereinafter described and claimed.

Reference is to be had to the accompanying drawings, forming a part of this specification, in which similar letters of reference indicate corresponding parts in all the figures.

Figure 1 is a side view of a hearse-body with interior parts exposed, the rear end being partly broken away laterally. Fig. 2 is a broken plan view of the bottom portion of the hearse-body shown in Fig. 1, and the improvement in position connected with a truck; and Fig. 3 is a transverse section, enlarged, of the improvement, taken on the line 3 3 in Fig. 2 opposite an adjacent arrow.

On the bottom A of the hearse-body B a truck C is placed, its wheels $a$ resting, preferably, on longitudinal track-strips $b$, so as to permit the truck to travel freely from end to end of said tracks or on the bottom of the body B.

The truck C is of ordinary construction, and has a transverse ledge $c$ secured on it for an interlocking engagement with a ledge on the coffin-bottom, (not shown,) and in said ledge $c$ perforations are made to receive pins or any other preferred equivalent device to prevent lateral movement of a coffin or casket when it is placed on the truck.

A controlling-strap D is connected removably to the truck C by the engagement of one of its ends with a hook $d$, that is affixed to the rear portion of the truck below or by any equivalent means, said strap having sufficient length to reach with its opposite terminal a transverse roller $e$, whereon said end portion of the strap is secured, as will be further explained.

The improved strap-retracting device preferably employed consists, essentially, of the roller $e$, journaled at each end in the bracket-stands $g$ $g'$, having a radial collar $h$ affixed on its body a proper distance from the bracket-stand $g$, the edge of said collar receiving the impinge of a friction-block $i$ when the roller is to be locked from rotation. The block $i$ is secured upon the upper end of an adjusting-screw $m$, which latter has threaded engagement with a nut-block $n$, that is affixed to the hearse-bottom, as shown in Figs. 1 and 3.

The end portion of the strap D, which is rearwardly extended from the truck C, is attached to the roller $e$ between the collar $h$ and the bracket-stand $g$. The bracket-supports $g$ $g'$ of the roller $e$ are located in a depressed portion A' of the hearse-bottom A and are thereto secured, so that the strap will be adapted to wrap upon itself in the space alloted for it on the roller $e$, and when stretched avoid contact with the lower surface of a coffin that may be deposited within the hearse, having one of its ends resting on an elevated part of the hearse-bottom that is about in the same plane with the upper surface of the truck.

Upon the portion of the roller $e$ that is embraced between the collar $h$ and bracket-stand $g'$ a spiral spring $o$ is mounted, having one end attached to the bracket-stand named and its opposite end secured to the collar, the pitch of its coils being in a proper direction to draw the strap D and wrap it upon the roller $e$ when free to do so.

In making the attachment of the strap D to the truck C it is essential that the strap be first wrapped neatly upon the roller, leaving the free end of just sufficient length to connect it with the hook $d$ of the truck, which arrangement of parts will cause the tension of the spring $o$ to normally retain the truck at the rear end of the hearse-body.

In service the depositing of one end of a coffin on the truck C and its subsequent movement forwardly will draw the strap D off of the roller $e$ and put a torsional strain upon the spring $o$. After the coffin has been located in the hearse, as has been before explained, the set-screw $m$ is adjusted by a manipulation of its handle, so as to cause the friction-block $i$ to bear upon the periphery of the collar $h$, and thereby retain the roller $e$ from rotation, the strap D being held taut by the adjustment mentioned.

When a coffin occupying the hearse, as stated, is to be removed therefrom, the friction on the roller $e$ is relaxed by manipulating the screw $m$, and the coffin withdrawn in an obvious manner, its lower end resting upon the truck C.

The longitudinal movement of the truck C toward the rear end of the hearse-body will relax the strain upon the strap D, which will be simultaneously wrapped on the roller $e$ and be there retained if the set-screw $m$ is adjusted to produce friction on the collar $h$.

Having thus described my invention, what I claim as new, and desire to secure by Letters Patent, is—

1. The combination, with a hearse-body and the truck traveling along the bottom thereof and provided with an operating-strap, of a take-up device mounted in the rear end of the hearse-bottom and connected to the outer end of the strap to take up the slack of the strap when the carriage is moved outward and let it run out when the carriage is moved inward, substantially as set forth.

2. The combination, with a hearse-body, a traveling truck therein, and a controlling-strap therefor, of a roller mounted transversely in the rear end of the hearse-bottom and connected to the outer end of the strap, and a torsion-spring thereon which will rotate the roller and wrap the strap thereon, substantially as described.

3. The combination, with a hearse-body, a wheeled truck longitudinally movable therein, and a controlling-strap removably secured by one end to the truck, of a transverse roller rotatably supported at its ends by bracket-stands and whereon the other end of the strap is attached, a radial collar on the roller, a spiral spring thereon having one end secured to the collar and its other end to a bracket-stand, and a friction-block adjustable from the hearse-bottom and adapted to bear upon the edge of the collar, substantially as described.

4. In a strap-coiling attachment for a hearse, the combination, with a movable truck detachably secured to one end of a controlling-strap, and a controlling-strap, of a rotatable transverse roller whereon the other end of said strap is attached, a spiral spring on the roller adapted to coil an end portion of the strap on a portion of the roller, and a friction device to restrain the roller from turning, substantially as described.

THOMAS J. WEIR.

Witnesses:
JOHN MEYER,
WM. E. PALMER.